Figure 1:
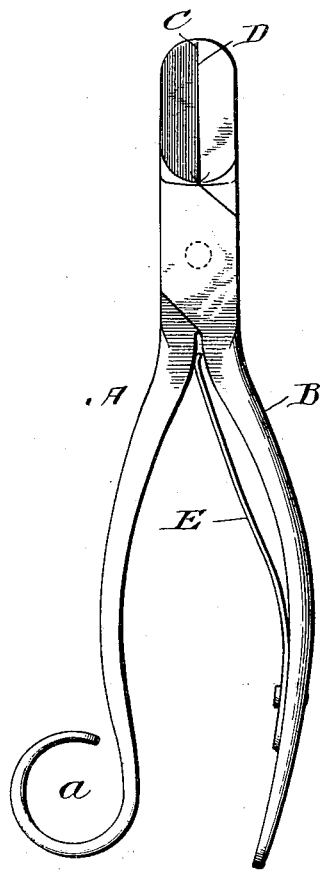

No. 648,224. Patented Apr. 24, 1900.
C. TRIOLO.
FRUIT CLIPPER.
(Application filed Feb. 12, 1900.)

(No Model.)

Witnesses:

Inventor:
Charles Triolo,
By his Attorneys,
Baldwin, Davidson & Wight.

THE NORRIS PETERS CO., PHOTO-LITHO., WASHINGTON, D. C.

UNITED STATES PATENT OFFICE.

CHARLES TRIOLO, OF OAK PARK, ILLINOIS.

FRUIT-CLIPPER.

SPECIFICATION forming part of Letters Patent No. 648,224, dated April 24, 1900.

Application filed February 12, 1900. Serial No. 4,988. (No model.)

*To all whom it may concern:*

Be it known that I, CHARLES TRIOLO, a citizen of the United States, residing at No. 105 Chicago avenue, Oak Park, in the county of Cook and State of Illinois, have invented certain new and useful Improvements in Fruit-Clippers, of which the following is a specification.

The object of my invention is to provide an improved tool or instrument for clipping or cutting the stems of oranges and lemons when gathering them from the trees and also for clipping the short lengths of stems that may remain on the fruit after being gathered.

Many years of experience in the fruit business have demonstrated the importance of properly clipping the stems of the fruit while being gathered. Oranges and lemons particularly need to have their stems cut close to the stars or caps at their inner ends, so as to leave no short projecting ends of the stems, while still leaving the caps or stars in place. It is well known by fruit dealers that as long as the green cap or stem remains on the fruit the fruit will remain fresh, as the pores of the backbone of the fruit are thus covered and air is excluded from the interior. It is thus important that the clipping instrument should sever the stems in such manner as to leave the caps in place. I have also found that the fruit is very seriously injured in packing when short lengths of stems protrude from the caps, because they often pierce, puncture, or bruise the peel or skin of other fruit with which they are packed, and when the peel or skin is punctured or bruised decay soon commences and the life of the fruit is limited. It is thus important that the stem should be clipped close to the cap or star without leaving either a short projecting end of stem or even a rough end or sliver thereof. Bearing in mind these important facts, I have devised a tool which even in the hands of an inexperienced operator or fruit-gatherer may be used to clip the stems in the manner above explained.

The tool comprises two members which are pivoted together and normally held open by a spring. The handles are of ordinary construction, but the jaws are of novel form, being so shaped that should their ends strike the fruit when the tool is being advanced they will not bruise or puncture it, and when clipping the stems the tool may be applied close to the caps or stars and then sever the stems with a clean sharp cut without any drag which would tend to remove the caps and without leaving any portion of the stem projecting in such manner as to come in contact with other fruit in packing. The jaws have cutting edges which do not overlap, but which meet at their outer portions, while the inner portions of the cutting edges neither overlap nor come together, but are a short distance apart when the jaws are closed. Thus it is insured that the portions of the heads which do the cutting always exactly meet. The under side of the jaws is flat, so as to lie close to the cap, while the upper side is inclined or hollowed out.

Figure 2:
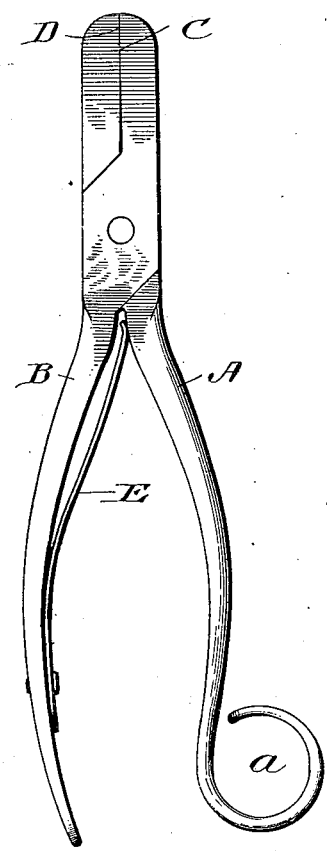
Figure 3:
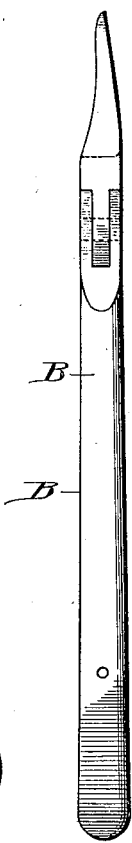

In the accompanying drawings, illustrating my invention, Figure 1 is a front elevation of the tool. Fig. 2 shows a rear view thereof. Fig. 3 shows a side elevation; and Fig. 4 is a detail view, on an enlarged scale, of the cutting end of the tool.

The tool is especially designed for clipping the stems of oranges and lemons; but it may be used for clipping the stems of other fruit. It consists of two principal members A and B. One of them is provided with a finger ring or guard $a$, and the handles are normally pressed apart, so as to hold the cutting edges C and D open by a spring E. This spring is pivoted, so that when the clipper is not in use the spring may be turned out of the way, and thus the cutting-jaws may be kept closed without being held closed by the hand. The front ends of the cutting-jaws are blunt, so that in advancing the tool if it should strike an orange or lemon it would not puncture or bruise it, as would a sharp point. The blades do not overlap, but they come together at their outer portions between the points $x$ and 2, but do not come together at their inner portions between the points $x$ and 3, thus leaving a narrow space between their inner edges. This feature I find to be of great importance, because by this construction the leverage is concentrated on the ends of the blades which embrace the stem, thus enabling the tool to make a smooth cut without leaving rough edges. If the blades came together from point to heel, this would not be the case, because the blades would not then be sure to come closely together and cut clear through the stem. If the meeting edges of the blades were long and there were any roughness or irregularity or any want of trueness in them, the blades would not close at the point where the cutting is done, thus producing a tendency, when the operator removes the tool, to pull off the cap or star or else to leave a small elevation or sliver.

Figure 4:
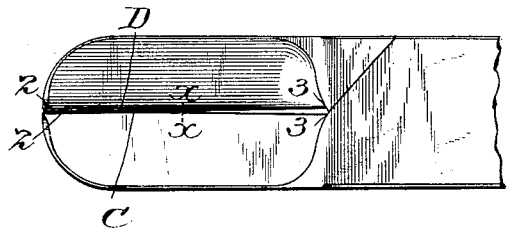

As shown clearly in Fig. 4, the portions of the cutting edges between the points $x$ and 2 lie parallel and close together, but from the point $x$ the cutting edges diverge toward the heel or toward the pivot of the tool. Particular care is taken in constructing the two members of the tool that the shoulders on opposite sides of the pivot shall fit exactly when the tool is closed.

The inward movement of the jaws is limited by the shoulders, the arrangement being such that the cutting edges come close together at their outer ends, but do not overlap and do not press against each other with such force as to become injured. If the shoulders were not made true and exact, there would be a tendency for the cutting edges to either overlap or to press against each other so as to be injured; but by proper care in the construction of the tool the cutting edges may be made to come together in contact from their outer ends inwardly for a short distance without pressing too hard against each other and without overlapping, while the inner portions of the edges are out of contact with each other.

I claim as my invention—

1. A fruit-clipper, comprising two members pivoted together and having jaws formed with cutting edges which meet without overlapping at their outer portions when they are closed, but which do not meet at their remaining contiguous portions, which extend inward toward the pivot of the tool.

2. A fruit-clipper, comprising two members pivoted together and having jaws formed with meeting, non-overlapping cutting edges, said meeting edges extending from the outer ends of the jaws inwardly, but terminating within the jaws at a distance from the pivot.

3. A fruit-clipper, comprising two members pivoted together and having jaws formed with meeting, non-overlapping cutting edges, extending inwardly from their outer portions and terminating within the jaws at a distance from the heels thereof, said members being provided with shoulders which limit the inward or closing movement of the jaws to such an extent as to permit the meeting edges to come together but prevent them from overlapping and the remaining portions of the edges from meeting.

In testimony whereof I have hereunto subscribed my name.

CHARLES TRIOLO.

Witnesses:
LLOYD B. WIGHT,
A. M. PARKINS.